(12) United States Patent
Huang et al.

(10) Patent No.: US 11,715,926 B2
(45) Date of Patent: Aug. 1, 2023

(54) BIDIRECTIONAL MODE-LOCKED FIBER LASER AND ASSOCIATED METHODS

(71) Applicant: The Reg. of the Univ. of Colorado, a body corp., Denver, CO (US)

(72) Inventors: Shu-Wei Huang, Broomfield, CO (US); Li Bowen, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 17/759,771

(22) PCT Filed: Jan. 29, 2021

(86) PCT No.: PCT/US2021/015887
§ 371 (c)(1),
(2) Date: Jul. 29, 2022

(87) PCT Pub. No.: WO2021/155273
PCT Pub. Date: Aug. 5, 2021

(65) Prior Publication Data
US 2023/0113927 A1 Apr. 13, 2023

Related U.S. Application Data

(60) Provisional application No. 62/968,815, filed on Jan. 31, 2020.

(51) Int. Cl.
*H01S 3/1109* (2023.01)
*H01S 3/067* (2006.01)
(Continued)

(52) U.S. Cl.
CPC ........ *H01S 3/1109* (2013.01); *H01S 3/06791* (2013.01); *H01S 3/08013* (2013.01); *H01S 3/08054* (2013.01); *H01S 3/094007* (2013.01)

(58) Field of Classification Search
CPC ............. H01S 3/06791; H01S 3/08013; H01S 3/08054; H01S 3/1106–1121
See application file for complete search history.

(56) References Cited

U.S. PATENT DOCUMENTS 9,306,363 B1 * 4/2016 Braga ................. H01S 3/06791
2003/0114117 A1   6/2003 Lam et al.
2018/0216996 A1 * 8/2018 Kieu ..................... H01S 3/1109

FOREIGN PATENT DOCUMENTS

CN   106410586 A   * 2/2017
CN   107069410 A     8/2017
(Continued)

OTHER PUBLICATIONS

Bowen et al., "Bidirectional Mode-Locked All-Normal Dispersion Fiber Laser", Aug. 7, 2020, Optica, vol. 7, No. 8, 961-964. (Year: 2020).*

(Continued)

*Primary Examiner* — Joshua King
(74) *Attorney, Agent, or Firm* — Cozen O'Connor (57) ABSTRACT

A bidirectional mode-locked fiber laser includes first and second passive optical fibers, a doped optical fiber, first and second polarization controllers, and first and second polarized beamsplitters that are arranged as a ring cavity with clockwise (CW) and counter-clockwise (CCW) directions. The laser imparts different nonlinear phase shifts in the CW and CCW directions, corresponding to CW and CCW repetition rates that are slightly different. When the normalized difference in repetition rates is less than approximately $10^{-5}$, both directions can be mode-locked simultaneously, thereby preventing one direction from inhibiting mode-locking of the other direction. Optical-fiber nonlinearity implements an intra-cavity bidirectional artificial saturable absorber based on nonlinear polarization rotation. The laser uses only components with normal group-velocity dispersion (GVD), (Continued)

thereby achieving higher pulse energies than mode-locked lasers utilizing negative GVD. The combination of artificial saturable absorber and normal GVD components increases pulse energy, which improves the efficiency of spectral broadening.

18 Claims, 7 Drawing Sheets

(51) Int. Cl.
    *H01S 3/08*     (2023.01)
    *H01S 3/094*     (2006.01)

(56) References Cited

FOREIGN PATENT DOCUMENTS

| | | | | | |
|---|---|---|---|---|---|
| CN | 108321667 | A | * | 7/2018 | ......... H01S 3/06712 |
| CN | 108963737 | A | * | 12/2018 | ......... H01S 3/06725 |
| CN | 111224309 | A | * | 6/2020 | |
| WO | WO-2013086203 | A1 | * | 6/2013 | ............ H01S 3/0092 |
| WO | WO-2015064957 | A1 | * | 5/2015 | ......... H01S 3/06791 |

OTHER PUBLICATIONS

Xu, "Nonlinear Polarization Rotration for Fiber Lasers with Ultra-High Pulse Energy", 2011, University of New Mexico, 1-5. (Year: 2011).*

Ran et al., "Bidirectional Mode-Locked Fiber Laser Emitting Scalar and Vector Noise-Like Pulses", Aug. 2019, 2019 18th ICOCN, 1-3. (Year: 2019).*

Braga et al., "Bidirectional mode-locked fiber ring laser using self-regenerative, passively controlled, threshold gating," Aug. 1, 2010, Optics Letters, vol. 35, No. 15, 2648-2650. (Year: 2010).*

PCT Application No. PCT/US21/15887 International Search Report, Written Opinion dated Jun. 9, 2021.

Bohn, et al., Bidirectional Kerr-lens Mode-locked Femtosecond Ring Laser, Optics Communications 141 (Aug. 15, 1997) pp. 53-58.

Li et al., Unidirectional Dissipative Soliton Operation in an All-Normal-Dispersion Yb-doped Fiber Laser Without an Isolator, Applied Optics, 7912, vol. 54, No. 26, Sep. 10, 2015, 5 pages.

Zhao et al., Self-Started Unidirectional Operation of a Fibre Ring Soliton Laser Without an Isolator, Journal of Optics A: Pure and Applied Optics, 9 477, 2007, 4 pages.

Ideguchi, et al., Kerr-lense Mode-Locked Bidirectional Dual-Comb Ring Laser for Broadband Dual-Comb Spectroscopy, Optica, Research Article, vol. 3, No. 7, Jul. 2016, pp. 748-753.

Kieu, et al., All-Fiber Bidirectional Passively Mode-Locked Ring Laser, Optics Letters, vol. 33, No. 1, Jan. 1, 2008, 4 pages.

Kieu et al., All-Fiber Normal-Dispersion Femtosecond Laser, NIH Public Access, Author Manuscript, Opt. Express, Jul. 25, 2011, 10 pages.

Chong et al., All-Normal-Dispersion Femtosecond Fiber With Pulse Energy Above 20 NJ, Optics Letters, vol. 32, No. 16, Aug. 15, 2007, 4 pages.

* cited by examiner

BIDIRECTIONAL MODE-LOCKED FIBER LASER AND ASSOCIATED METHODS

RELATED APPLICATIONS

This application is a 35 U.S.C. § 371 filing of International Application No. PCT/US2021/015887, filed on Jan. 29, 2021, which claims priority to U.S. Provisional Patent Application No. 62/968,815, filed on Jan. 31, 2020. Each of these applications is incorporated herein by reference in its entirety.

BACKGROUND

Dual-comb spectroscopy (DCS) can be used to remotely sense a variety of trace gases with a sensitivity that rivals, or exceeds, that of prior-art techniques. DCS uses two optical frequency combs whose spectra contain hundreds of thousands of frequencies, or more, covering the visible, near-infrared, and/or mid-infrared regions of the electromagnetic spectrum. Due to these broad spectra, one DCS spectrometer can be used to detect several species of gases, unlike other types of remote trace gas detectors utilizing single-frequency lasers. For example, a single DCS system has been demonstrated to detect the most common gases that leak at oil and gas facilities, including methane, acetylene, carbon dioxide, water vapor, carbon monoxide, hydrogen sulfide, ethylene, ethane, propane, butane, and BTEX (benzene, toluene, ethylbenzene, and xylene). In fact, DCS can detect several of these species simultaneously, as well as other types of volatile organic compounds and hydrocarbons.

SUMMARY

In many prior-art DCS systems, two optical frequency combs are generated from two pulse trains outputted by two corresponding pulsed lasers that operate independently of each other and at slightly different repetition rates. Usually the pulsed lasers are mode-locked femtosecond lasers, although lasers based on parametric generation and electro-optic modulation can be used as well. The two pulsed lasers may share certain optical components, such as a gain medium or a mirror, to reduce size and complexity. In addition, noise (e.g., thermal drift, mechanical vibrations, etc.) coupling into the laser cavities via shared components may affect both pulse trains similarly, and therefore can be suppressed via common-mode rejection. As a result, shared components increase the detection signal-to-noise that can be achieved with DCS, as well as increasing robustness to external environmental perturbances.

The present embodiments include a bidirectional mode-locked fiber ring laser that simultaneously outputs two pulse trains with slightly different repetition rates. Advantageously, one of these lasers can replace two separate conventional mode-locked lasers used for DCS, thereby reducing size and complexity of a DCS system. The bidirectional mode-locked fiber laser of the present embodiments includes optical components forming a single ring cavity that can support simultaneous mode-locking in both clockwise (CW) and counter-clockwise (CCW) directions. Since the CW and CCW pulse trains both pass through all of the optical components, high common-mode rejection can be obtained from the two outputs, providing an additional benefit over the use of two separate mode-locked lasers.

Some of the present embodiments use only components having normal group-velocity dispersion (GVD). This all-normal-dispersion (AND) design helps achieve higher pulse energies than mode-locked lasers that utilize negative GVD to manage intracavity dispersion. The present embodiments also use nonlinear polarization rotation (NPR) to implement an intracavity bidirectional artificial saturable absorber, as opposed to a real saturable absorber. NPR, like other types of artificial saturable absorbers, has a significantly faster response time than real absorbers, and therefore can be used to produce pulses with a larger bandwidth, and thus higher pulse energy.

Advantageously, the higher pulse energies that can be achieved by combining the AND design with NPR facilitate the spectral shaping needed for DCS. Many conventional mode-locked lasers used for DCS output a pulse train whose spectrum is not sufficiently wide enough to cover the spectral lines of the atomic or molecular species to be detected. A nonlinear optical component, such as a photonic crystal fiber or microstructured fiber, is frequently used for spectral broadening outside of the laser cavity. To improve this spectral broadening, an optical amplifier may be used to boost the pulse energy prior to spectral broadening. Accordingly, the higher pulse energies provided by the present embodiments advantageously reduce the requirements for this external amplification, if not eliminating its need altogether.

Like many prior-art bidirectional mode-locked ring lasers, the present embodiments operate with different nonlinear phase shifts (NLPs) in the CW and CCW directions. Due to this non-zero difference between the CW NLP and the CCW NLP, the optical path length of one full pass through the ring cavity in the CW direction is different than the optical path length in the CCW direction, even though the physical path length of the ring cavity is the same for both directions. The difference in optical path lengths gives rise to a non-zero difference between the repetition rate $f_{rep}^{(CW)}$ of the CW pulse train and the repetition rate $f_{rep}^{(CCW)}$ of the CCW pulse train. For clarity, let $\Delta f_{rep} = |f_{rep}^{(CCW)} - f_{rep}^{(CW)}|$ be the absolute value of the difference in repetition rates, and $df_{rep} = \Delta f_{rep}/f_{rep}^{(CW)} \approx \Delta f_{rep}/f_{rep}^{(CCW)}$ be the normalized difference in repetition rates. Thus, $\Delta f_{rep}$ and $df_{rep}$ are both non-negative.

One aspect of the present embodiments is the realization that simultaneous bidirectional mode-locking in both CW and CCW directions can be achieved for small non-zero values of $df_{rep}$. Here, "small" means less than approximately $10^{-5}$, or $0 < df_{rep} \leq 10^{-5}$. This range is referred to herein as the small-$df_{rep}$ regime. Prior-art mode-locked fiber lasers operate in the high-$df_{rep}$ regime (i.e., $df_{rep} \geq 10^{-5}$), where competition between gain in the CW and CCW directions always results in unidirectional mode-locking regardless of pump power. Thus, by operating a mode-locked fiber laser in the small-$df_{rep}$ regime, simultaneous bidirectional mode-locking can be achieved without any additional components (e.g., an anti-saturable absorber or pulse-energy limiter that reduces competition between gain in the CW and CCW directions).

DETAILED DESCRIPTION

Figure 1:
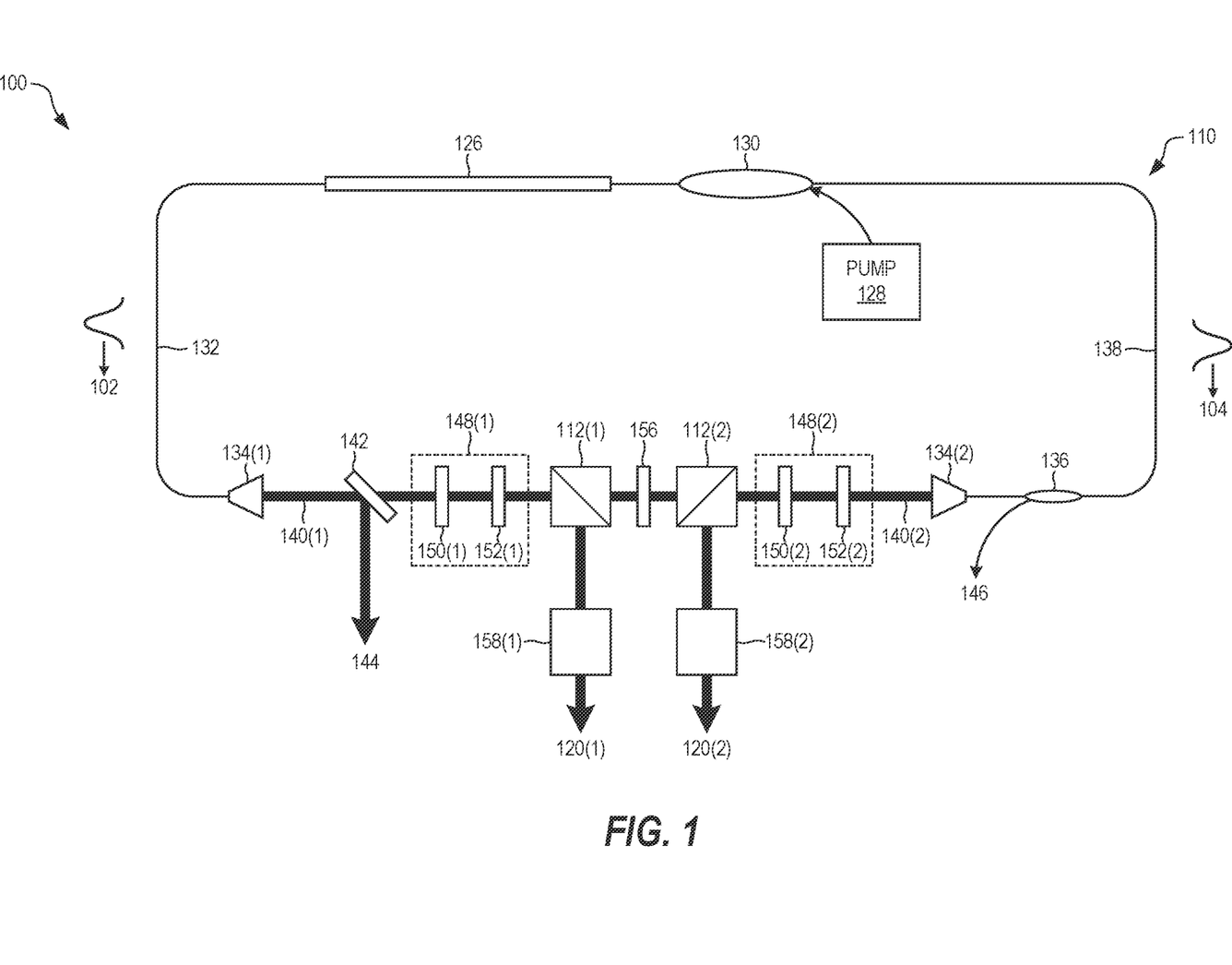
FIG. 1 shows a bidirectional mode-locked fiber laser that mode-locks in both clockwise and counter-clockwise directions simultaneously, in an embodiment.

FIG. 1 shows a bidirectional mode-locked fiber laser 100 that mode-locks in both clockwise (CW) and counter-clockwise (CCW) directions simultaneously. The fiber laser 100 uses fiber-optic and free-space components arranged in a loop 110 to simultaneously generate a CW pulse train 104 and a CCW pulse train 102 that propagate around the loop 110 in opposite directions. The loop 110 includes a doped fiber 126 that serves as a gain medium. The doped fiber 126 is pumped by a pump laser 128 whose output (i.e., pump light) is coupled into the loop 110 via a pump combiner 130. The loop 110 also includes a first optical fiber 132 that couples one end of the doped fiber 126 to a first collimator 134(1) that outputs the CCW pulse train 102 as a first free-space beam 140(1). The loop 110 also includes a second optical fiber 138 that couples the pump combiner 130 to a second collimator 134(2) that outputs the CW pulse train 104 as a second free-space beam 140(2). The optical fibers 132, 138 are also referred to herein as "passive" fibers to differentiate them from the active gain of the doped fiber 126.

To achieve nonlinear polarization rotation, the bidirectional mode-locked fiber laser 100 includes first and second polarization controllers 148(1) and 148(2). Due to nonlinear phase shifts imparted onto the pulse trains 102 and 104 by the optical fibers 132 and 138, the first free-space beam 140(1) is elliptically polarized. The first polarization controller 148(1) includes a first quarter-waveplate 152(1) that can be adjusted to convert this elliptical polarization into linear polarization. The first polarization controller 148(1) also includes a first half-waveplate 150(1) that can be adjusted to rotate the linear polarization, thereby controlling the fraction of the first free-space beam 140(1) that is reflected by a first polarized beamsplitter (PBS) 112(1) to form a first output beam 120(1). Similarly, the second polarization controller 148(2) includes a second quarter-waveplate 152(2) that can be adjusted to convert the elliptical polarization of the second free-space beam 140(2) into linear polarization, and a second half-waveplate 150(2) that can be adjusted to rotate this linear polarization, thereby controlling the fraction of the second free-space beam 140(2) that is reflected by a second PBS 112(2) to form a second output beam 120(2). While FIG. 1 shows each polarization controller 148 as a combination of a half-waveplate 150 and quarter-waveplate 152, each of the polarization controllers 148(1) and 148(2) may be formed from one or more other components that control polarization (e.g., an electro-optic phase shifter, a liquid-crystal phase shifter, a Babinet-Soleil compensator, etc.). Alternatively, the first polarization controller 148(1) can be implemented with one or more fiber squeezers that compress the first optical fiber 132 to change its birefringence. The second polarization controller 148(2) may be similarly implemented with one or more fiber squeezers that compress the second optical fiber 138 to change its birefringence.

To support simultaneous bidirectional mode-locking with different repetition rates, the bidirectional mode-locked fiber laser 100 is designed with asymmetric nonlinear phase shifts. Specifically, the doped fiber 126 imparts a nonlinear phase shift $\phi_1 = \gamma_{DF}^{(CCW)} P_{CCW} L_{DF}$ onto the CCW pulse train 102, where $\gamma_{DF}^{(CCW)}$ is the effective nonlinear coefficient of the doped fiber 126 in the CCW direction, $P_{CCW}$ is the power of the CCW pulse train 102, and $L_{DF}$ is the length of the doped fiber 126. Similarly, the first optical fiber 132 imparts a nonlinear phase shift $\phi_2 = k_1 \gamma_1 P_{CCW} L_1$ onto the CCW pulse train 102, where $k_1$ is the fraction of the power of the CCW pulse train 102 that is coupled from the doped fiber 126 into the first optical fiber 132, $\gamma_1$ is the nonlinear coefficient of the first optical fiber 132, and $L_1$ is the length of the first optical fiber 132. After a portion of the CCW pulse train 102 is coupled out of the loop 110 via the first PBS 112(1), the remaining portion of the CCW pulse train 102 propagates through the second optical fiber 138 to return to the doped fiber 126. Due to the reduced power in the second optical fiber 138, the nonlinear phase shift imparted onto the CCW pulse train 102 by the second optical fiber 138 is small enough that it can be ignored. Free-space components between, and including, the collimators 134(1) and 134(2) are linear and therefore do not impart any nonlinear phase shift onto the pulse trains 102 and 104. Therefore, the total nonlinear phase shift in the CCW direction is $$\varphi_{CCW} \approx \phi_1 + \phi_2 = \gamma_{DF}^{(CCW)} P_{CCW} L_{DF} + k_1 \gamma_1 P_{CCW} L_1 \qquad (1)$$

A similar argument in the CW direction gives $$\varphi_{CW} \approx \phi_3 + \phi_4 = \gamma_{DF}^{(CW)} P_{CW} L_{DF} + k_2 \gamma_2 P_{CW} L_2, \qquad (2)$$

where $\gamma_{DF}^{(CW)}$ is the effective nonlinear coefficient of the doped fiber 126 in the CW direction, $k_2$ is the fraction of the power of the CW pulse train 104 that is coupled from the doped fiber 126 into the second optical fiber 138, $P_{CW}$ is the power of the CW pulse train 104, and $L_2$ is the length of the second optical fiber 138. The phase shifts $\varphi_{CCW}$ and $\varphi_{CW}$ are asymmetric in that $\varphi_{CCW} \neq \varphi_{CW}$.

Each pulse of the CCW pulse train 102 travels once around the loop 110 in a CCW loop time $\Delta t^{(CCW)}$ that depends on $\varphi_{CCW}$, while each pulse of the CW pulse train 104 travels once around the loop 110 in a CW loop time $\Delta t^{(CW)}$ that depends on $\varphi_{CW}$. Accordingly, the CCW pulse train 102 has a CCW repetition rate $f_{rep}^{(CCW)}=1/\Delta t^{(CCW)}$, and the CW pulse train 104 has a clockwise repetition rate of $f_{rep}^{(CW)}=1/\Delta t^{(CW)}$. Since $\varphi_{CCW} \neq \phi_{CW}$, the repetition rates $f_{rep}^{(CCW)}$ and $f_{rep}^{(CW)}$ are not identical, even though the pulse trains 102 and 104 travel through the same loop 110. The difference in repetition rates $\Delta f_{rep} = f_{rep}^{(CCW)} - f_{rep}^{(CW)}$ can be controlled from less than 0.1 Hz to more than 150 Hz by changing the power outputted by the pump laser 128, a first polarization controller 148(1), a second polarization controller 148(2), or a combination thereof. Such small differences in the repetition rates $f_{rep}^{(CCW)}$ and $f_{rep}^{(CW)}$ are particularly advantageous for dual-comb spectroscopy (DCS), which relies on two spatially-overlapped pulse trains whose repetition rates differ by approximately this amount.

The bidirectional mode-locked fiber laser 100 operates in the small-$df_{rep}$ regime. Specifically, the fiber laser 100 is designed with asymmetric nonlinear phase shifts $\varphi_{CCW}$ and $\varphi_{CW}$ such that the normalized difference in repetition rates $df_{rep}$ is less than or equal to $10^{-5}$. As described in more detail below, simultaneous bidirectional mode-locking of the fiber laser 100 has been experimentally demonstrated for values of $df_{rep}$ up to $3.3 \times 10^{-6}$. The stable operation observed at $df_{rep} = 3.3 \times 10^{-6}$ indicates that simultaneous bidirectional mode-locking could be achieved for values of $df_{rep}$ up to $10^{-5}$. However, prior-art mode-locked ring lasers operating with values of $df_{rep}$ exceeding $10^{-4}$ have only achieved unidirectional mode-locking.

Asymmetric nonlinear phase shifts can be generated by varying any of the parameters in Eqns. 1 and 2. For example, the lengths of the optical fibers 132 and 138 can be made slightly different (i.e., $L_1 \neq L_2$). Alternatively, the first optical fiber 132 and the second optical fiber 138 can be made with different materials or core sizes (i.e., $\gamma_1 \neq \gamma_2$). In this case, the optical fibers 132 and 138 can have the same length or different lengths. In one embodiment, each of the optical fibers 132 and 138 is a single-mode fiber (e.g., Corning HI1060). In one embodiment, $L_1 = 0.7$ m and $L_1 = 1.2$ m.

Asymmetric nonlinear phase shifts can be generated using optical fibers 132 and 138 that are of the same nominal type and nominal length. When the optical fibers 132 and 138 have the same length, the fiber laser 100 has a symmetric cavity. However, a slight difference in the optical-fiber lengths (e.g., 1 mm, or less) may arise due to imperfections in cutting, cleaving, measuring, etc. Similarly, manufacturing variations may cause two pieces of the same type of optical fiber to have slightly different nonlinear coefficients. These slight variations are still enough to ensure simultaneous bidirectional mode-locking, even for a symmetric cavity.

Figure 2:
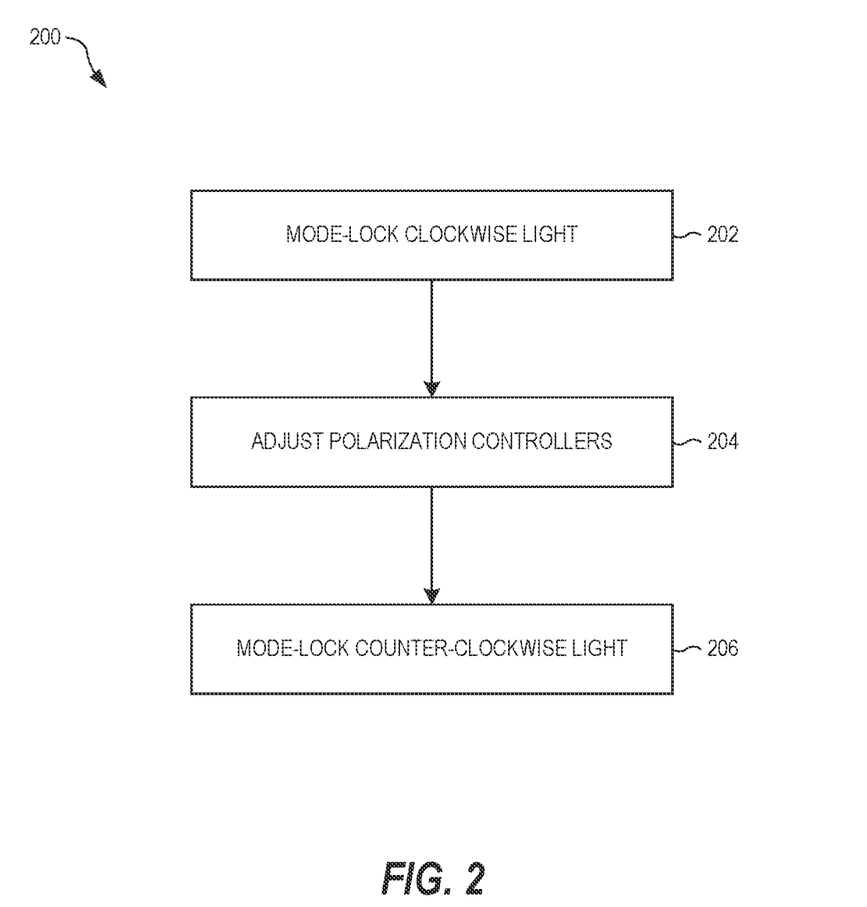
FIG. 2 is a flow chart of a method for mode-locking the bidirectional mode-locked fiber laser of FIG. 1, in embodiments.

Another way to generate asymmetric nonlinear phase shifts is to change the direction along which pump light is coupled into the doped fiber 126. For example, FIG. 2 shows the pump combiner 130 coupling pump light into the CCW direction of the loop 110. The pump combiner 130 may be alternatively located on the other end of the doped fiber 126, wherein the pump combiner 130 couples pump light into the CW direction of the loop 110. These examples of unidirectional pumping of the doped fiber 126 cause $\gamma_{DF}^{(CW)}$ and $\gamma_{DF}^{(CCW)}$ to differ. In other embodiments, two pump combiners 130 are used to couple pump light into both ends of the doped fiber 126. In this case, the amount of pump light coupled into each end of the doped fiber 126 can be controlled to adjust how much $\gamma_{DF}^{(CW)}$ and $\gamma_{DF}^{(CCW)}$ differ.

The doped fiber 126 may be doped with ytterbium, erbium, neodymium, holmium, or another dopant. In one example, the doped fiber 126 is a double-clad ytterbium-doped fiber with a length of two meters. In this case, the pump laser 128 may be a high-power (e.g., two watts or more) multimode laser with an output at 980 nm that is coupled into an inner cladding of the double-clad fiber. However, the doped fiber 126 may have a different length without departing from the scope hereof.

In some embodiments, both the optical fibers 132 and 138 and the doped fiber 126 are large-mode area, few-mode optical fibers with matching core size to reduce fiber nonlinearity, thereby increasing pulse energy. For example, the doped fiber 126 may be a piece of Nufern LMA-YDF-10/125-9M fiber while each of the optical fibers 132, 138 may be a piece of Nufern LMA-GDF-10/125-M fiber. As another example, the doped fiber 126 may be a piece of Nufern LMA-YDF-20/130-130M fiber while each of the optical fibers 132, 138 may be a piece of Nufern LMA-GDF-20/130-M fiber. Since multiple spatial modes are supported in few-mode fibers, these embodiments can achieve bidirectional mode-locking on a fundamental spatial mode, a single higher-order spatial mode, or multiple spatial modes (i.e., spatial temporal mode-locking), thereby benefitting different applications.

In another embodiment, the doped fiber 126 is a tapered doped fiber, wherein the fiber nonlinear coefficient $\gamma$ depends on distance along the length of the tapered fiber. In this case, the nonlinear phase shift imparted by the tapered fiber is $\int \gamma(x) P dx$, where the integral is taken over the length of the tapered fiber. When used with unidirectional pumping, the doped fiber 126 being tapered further causes $\gamma_{DF}^{(CW)}$ and $\gamma_{DF}^{(CCW)}$ to differ.

In some embodiments, the bidirectional mode-locked fiber laser 100 includes a spectral bandpass filter 156 between the first PBS 112(1) and the second PBS 112(2). The bandpass filter 156 stabilizes mode-locked operation of the fiber laser 100 by producing self-amplitude modulation, which allows the nonlinear polarization evolution to be biased to higher pulse energies. The bandpass filter 156 may be an interference filter or birefringent filter (e.g., a Lyot filter) with a full-width at half maximum (FWHM) bandwidth of several nanometers (e.g., 10 nm) centered at a center wavelength of the pulse trains 102 and 104. For example, when the doped fiber 126 is a double-clad ytterbium-doped fiber with a length of two meters, the bandpass filter 156 may be selected with a center wavelength of 1070 nm and a FWHM bandwidth of 10 nm.

As shown in FIG. 1, a first optical isolator 158(1) may be used to block reflections of the first output beam 120(1) from coupling back into the loop 110, where they can negatively impact operation of the bidirectional mode-locked fiber laser 100. Similarly, a second optical isolator 158(2) may be used to block reflections of the second output beam 120(2) from coupling back into the loop 110. A free-space sampler 142 may be used to reflect a first portion 144 (e.g., 3%) of the first free-space beam 140(1) for monitoring the CCW pulse train 102. The loop 110 may also include a fiber coupler 136 that outputs a second portion 146 (e.g., 1%) of the CW pulse train 104 for monitoring the CW pulse train 104. The second portion 146 may be alternatively generated with a free-space sampler (e.g., similarly to the free-space sampler 142) instead of the fiber coupler 136. Similarly, the first portion 144 may be generated with a fiber coupler (e.g., similarly to the fiber coupler 136) instead of the free-space sampler 142.

While FIG. 1 shows the fiber laser 100 as a combination of fiber-optic and free-space components, any one or more of the free-space components may be alternatively implemented as a corresponding fiber-optic component. These free-space components include the sampler 142, the first polarization controller 148(1) and second polarization controller 148(2), the first PBS 112(1) and second PBS 112(2), the bandpass filter 156, and the first optical isolator 158(1) and second optical isolator 158(2). In some embodiments, all of the components of the fiber laser 100 are fiber-optic, in which case the fiber laser 100 is an all-fiber laser. In this case, the collimators 134(1) and 134(2) are unnecessary, and therefore may be excluded.

In addition to the AND design described above, some of the present embodiments include components that introduce anomalous dispersion (i.e., negative GVD) into the cavity. The anomalous dispersion may be introduced, for example, via an optical fiber and/or "bulk" optics (e.g., prisms and/or gratings). An amount of the anomalous dispersion may be chosen to compensate for normal dispersion in the cavity, such that the total dispersion is close to zero. In this case, the laser operates in the dispersion-managed regime. Alternatively, the amount of the anomalous dispersion may be selected to be large relative to any normal dispersion in the cavity, wherein the laser operates in the soliton regime.

FIG. 2 is a flow chart of a method 200 for mode-locking the bidirectional fiber laser 100 of FIG. 1. In the block 202, the fiber laser 100 is mode-locked in the CW direction, i.e., the fiber laser 100 is controlled to transition from continuous-wave lasing in the CW direction to CW mode-locking in which the fiber laser 100 stably generates the CW pulse train 104. In the block 204, which occurs after the block 202, one or both of the first and second polarization controllers 148 are adjusted to simultaneously achieve CW mode-locking and continuous-wave lasing in the CCW direction. In the block 206, which occurs after the block 204, the fiber laser 100 is additionally mode-locked in the CCW direction, i.e., the fiber laser 100 is controlled to transition from continuous-wave lasing to CCW mode-locking in which the fiber laser 100 stably generates the CCW pulse train 102. After the block 206, the fiber laser 100 is simultaneously mode-locked in both CW and CCW directions, and the fiber laser 100 simultaneously outputs both the CCW pulse train 102 and the CW pulse train 104. While FIG. 2 shows CW mode-locking preceding CCW mode-locking, the method 200 may be alternatively implemented with CCW mode-locking preceding CW mode-locking (i.e., the blocks 202 and 206 may be swapped).

In embodiments, a method for controlling the bidirectional mode-locked fiber laser 100 includes changing a pump power coupled into the doped fiber 126 to change a difference between the CCW repetition rate of the CCW pulse train 102 and the CW repetition rate of the CW pulse train 104.

In embodiments, a method for controlling the bidirectional mode-locked fiber laser 100 includes adjusting one or both of the first and second polarization controllers 148(1) and 148(2) to change a difference between the CCW repetition rate of the CCW pulse train 102 and the CW repetition rate of the CW pulse train 104.

In embodiments, a method for bidirectionally mode-locking a fiber laser includes simultaneously generating CW and CCW pulse trains from a single ring cavity of the fiber laser. The fiber laser (i) uses nonlinear polarization rotation to implement bidirectional artificial saturable absorption, and (ii) is configured in the small-$df_{rep}$ regime. The method may further include initiating clockwise mode-locking to generate the clockwise pulse train, and initiating counter-clockwise mode-locking to generate the counter-clockwise pulse train. The clockwise pulse train has a clockwise repetition rate, the counter-clockwise pulse train has a counter-clockwise repetition rate, and a normalized difference of the clockwise and counter-clockwise repetition rates may be less than $10^{-5}$.

Experimental Demonstration

Bidirectional mode-locked oscillator is an emerging light source architecture suitable for dual-comb applications. Therein, bidirectional mode-locked fiber lasers (MLFLs) are particularly promising for their cost effectiveness, system compactness and environmental robustness. However, the pulse energy has been limited to tens of pJ, restricting practical dual-comb applications in the nonlinear regime. The following discussion shows how the pulse energy limit was broken by devising the first bidirectional all-normal dispersion MLFL with an artificial saturable absorber (ASA). Bidirectional dissipative solitons are generated with >5-THz bandwidths and >1-nJ pulse energies. Free-running laser performance is extensively characterized, and the physical mechanism for bidirectional ASA mode-locking is studied. Last but not least, transmission of an optical filter is measured using dual-comb spectroscopy.

A bidirectional mode-locked oscillator is a light source that simultaneously generates two sets of pulse trains from counter-propagating directions in a single laser ring cavity. It has emerged recently due to its inherent cancellation of common-mode noises and passive stabilization of repetition rate difference, thus enabling diverse applications in precision metrology such as rotation sensing, asynchronous sampling, and particularly dual-comb spectroscopy, which has revolutionized conventional spectroscopy by its fast data acquisition, fine spectral resolution, and high signal-to-noise ratio. Consequently, significant research efforts have been devoted to realizing bidirectional mode-locked oscillators in various platforms. Therein, bidirectional MLFLs have attracted much attention thanks to their unique advantage of cost effectiveness, system compactness and environmental robustness.

Dual-wavelength MLFLs are more widely demonstrated for dual-comb applications compared to bidirectional ones. However, their wavelength multiplexing principle requires minimal spectral overlap between the two combs. Consequently, external amplification and nonlinear spectral broadening are required to create spectral overlapping for dual-comb applications, which inevitably increase the system complexity and degrade the stability. Moreover, the unidirectional intra-cavity collision between the two pulse trains induces noticeable periodic perturbations and will influence the dual-comb performance if comb-line-limited resolution needs to be obtained. In comparison, bidirectional MLFLs provide excellent spectral overlapping and minimized cross talk simultaneously, therefore are the ideal candidate for dual-comb applications.

However, until now all bidirectional MLFLs have relied on real saturable absorbers (SA). Compared to artificial saturable absorbers (ASAs) like nonlinear polarization rotation (NPR) and nonlinear amplifying loop mirror (NALM), SAs have much slower time response and require soliton pulse shaping to achieve a larger bandwidth, which in turn restricts the attainable pulse energy to tens of pJ. Similarly, hybrid bidirectional MLFLs that include both SA and NPR have also been implemented recently, where the NPR facilitates the pulse shortening to achieve a larger mode-locking bandwidth. Overall, self-referenced bidirectional MLFLs with high mutual coherence and relative stability have been demonstrated but the maximum attainable pulse energy was still limited to 50 pJ. Thus, external amplifiers are required for practical applications of bidirectional MLFLs.

Large pulse energy at the nJ-level, not achievable in state-of-the-art bidirectional MLFLs, is particularly important for various nonlinear dual-comb applications such as pump-probe spectroscopy, asynchronously pumped optical parametric oscillator, and coherent Raman spectro-imaging. Such pulse energy limit can be surpassed by devising a bidirectional MLFL mode-locked with an ASA in the dissipative soliton regime such as all-normal dispersion (ANDi) lasers that feature much higher pulse energy (tens of nJ), broader optical bandwidth and flat-top spectral shape. Unfortunately, bidirectional operation has not yet been demonstrated in any ASA based MLFLs. On the contrary, it has been suggested that bidirectional mode-locking is not feasible in ASA based MLFLs and they always operate unidirectionally even without any intra-cavity isolator.

The following discussion presents results of the first experimentally demonstration a bidirectional ANDi laser based on NPR. Single-pulse fundamental mode-locking was established in both directions with flat-top spectra spanning more than 20 nm at 1070 nm and output pulse energies greater than 1 nJ, more than an order of magnitude higher than state-of-the-art bidirectional MLFLs. The fundamental repetition rate ($f_{rep}$) is 46 MHz, and the repetition rate difference ($\Delta f_{rep}$) between the two directions was continuously tunable from 0.1 Hz to more than 100 Hz through adjustment of the pump power and the wave plates without losing or changing the mode-locked state, which brings significant flexibility to accommodate different applications. In addition, free-running frequency stability, common-mode noise cancellation, single-sideband (SSB) phase noise, and relative intensity noise (RIN) of the bidirectional ANDi laser were comprehensively characterized and analyzed. Moreover, distinctly different spectral and power evolutions between the two directions were observed and studied both experimentally and numerically, elucidating the indispensable role of cavity asymmetry in establishing the bidirectional NPR mode-locking. Finally, a proof-of-concept dual-comb spectroscopy was demonstrated.

Figure 3A:
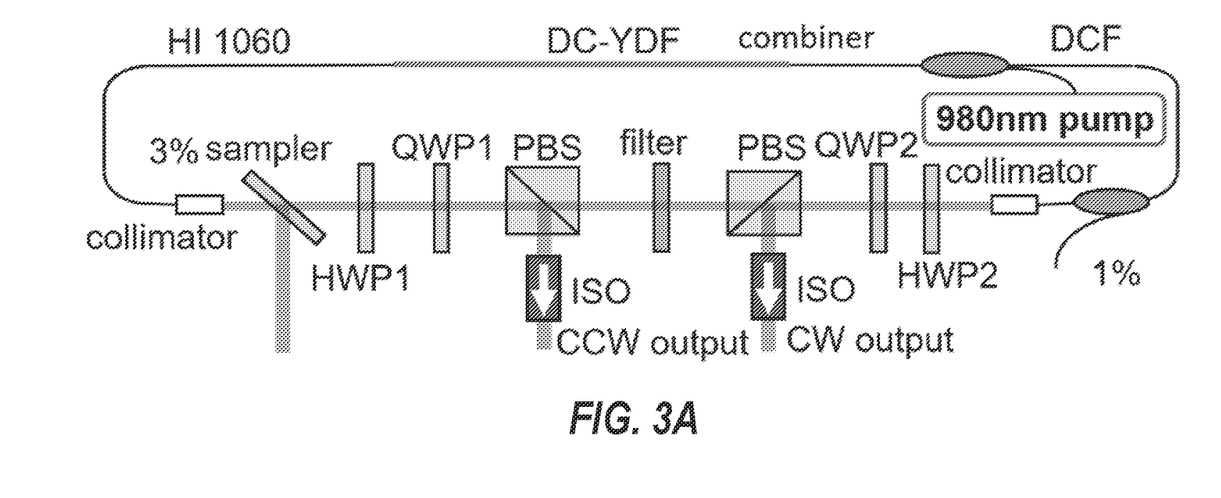
FIG. 3A shows an experimental set-up of the bidirectional mode-locked all-normal dispersion laser, in an embodiment.

FIG. 3A shows the experimental set-up. A 2-m double-cladding ytterbium-doped fiber (DC-YDF, YB1200-6/125DC), pumped by a multimode 980-nm laser, was used as the gain medium. The pump was launched into the DC-YDF through a pump combiner which had 0.3-m double-cladding fiber (DCF, Coractive-DCF-UN-6/125-14) pigtails on both ends. The rest of the fiber components in the cavity consisted of a 0.7-m HI 1060 fiber on the left side and a 99/1 fiber coupler (with 0.6-m HI 1060 fiber pigtails on both ends) on the right side for monitoring the mode-locked pulses in the clockwise (CW) direction. Therefore, a total of 0.7-m and 1.2-m passive fiber were deployed asymmetrically on the left and right side of the gain media, respectively. Between the two collimators a free-space beam sampler (3%) was placed on the left side for monitoring the mode-locked pulses in the counter-clockwise (CCW) direction. Two quarter-wave plates (QWPs) and two half-wave plates (HWPs) were deployed for polarization control and two polarization beam splitters (PBSs) were used to couple the laser light out of the cavity. Between the two PBSs, a 10-nm bandwidth Gaussian shape spectral filter centered at 1070 nm (Thorlabs, FB1070-10) was used. Optical isolators (ISOs) were placed at both output ports to prevent any back-reflections.

Figure 3B:
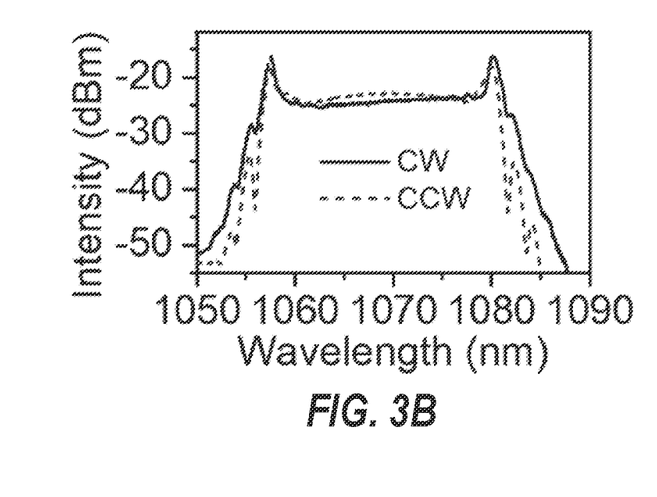
FIG. 3B shows optical spectra of mode-locked pulses measured with the experimental set-up of FIG. 3A.
Figure 3C:
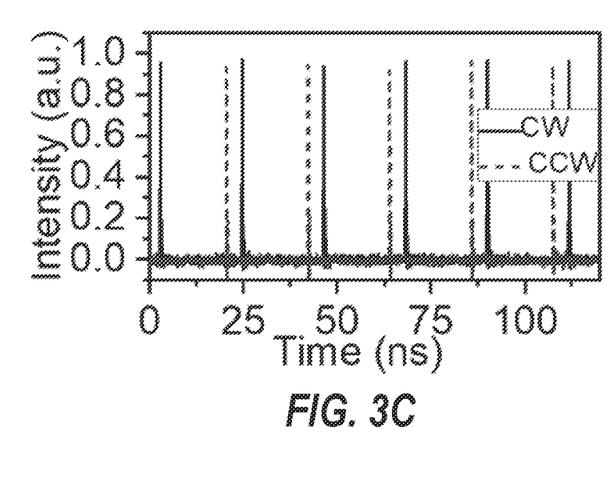
FIG. 3C shows oscilloscope traces of mode-locked pulses measured with the experimental set-up of FIG. 3A.

By increasing the pump power to 1.8 W, bidirectional mode-locking was achieved. FIG. 3B shows the optical spectra for various pump powers. Benefiting from the dissipative soliton formation mechanism, the optical spectra for both directions were spectrally flat (<2 dB fluctuation) over 20 nm (5.3 THz). Such broadband flat-top spectra are highly desirable for dual-comb spectroscopy. At the pump power of 2 W, the output powers of the CW and CCW directions were 50 mW and 72 mW, respectively, corresponding to pulse energies of more than 1 nJ for both directions. The efficiency can be further improved, thus reducing the pump power requirement, by minimizing the transmission loss of the Gaussian filter and utilizing large-core DC-YDFs with higher pump absorption. Time domain waveforms were measured using a 10-GHz photodetector and a 20-GHz real-time oscilloscope to confirm that both directions were fundamentally mode-locked, as shown in FIG. 3C.

Figure 4A:
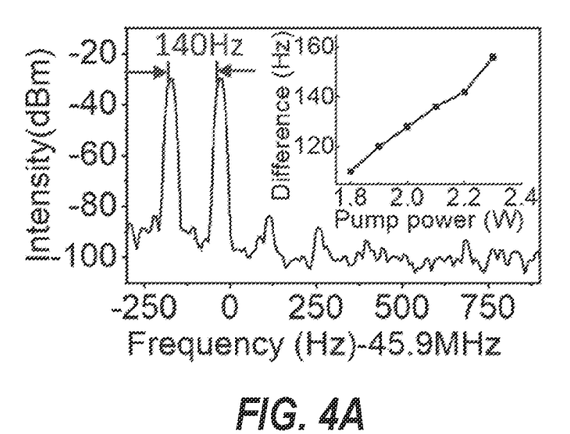
FIG. 4A is a spectral plot showing two tones corresponding to the two repetition rates of the bidirectional mode-locked laser of FIG. 3A.
Figure 4B:
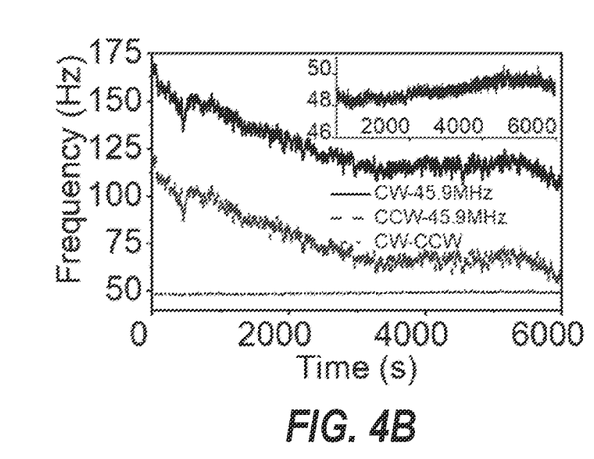
FIG. 4B is a plot of frequency versus time showing the stability of the repetition rates of the bidirectional mode-locked laser of FIG. 3A.
Figure 4C:
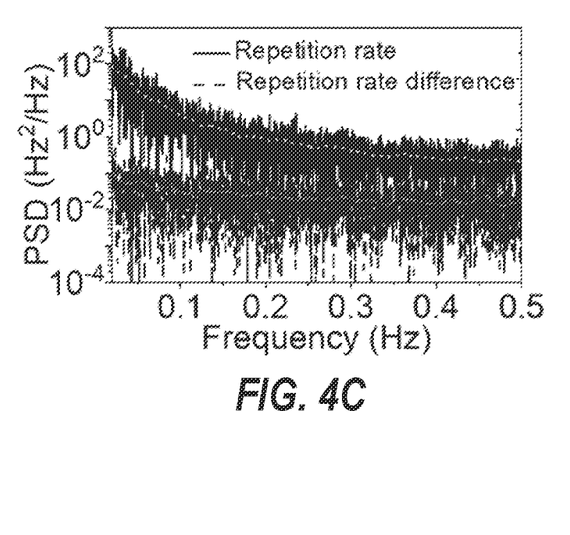
FIG. 4C is a plot of power spectral density of the repetition rates of the bidirectional mode-locked laser of FIG. 3A.
Figure 4D:
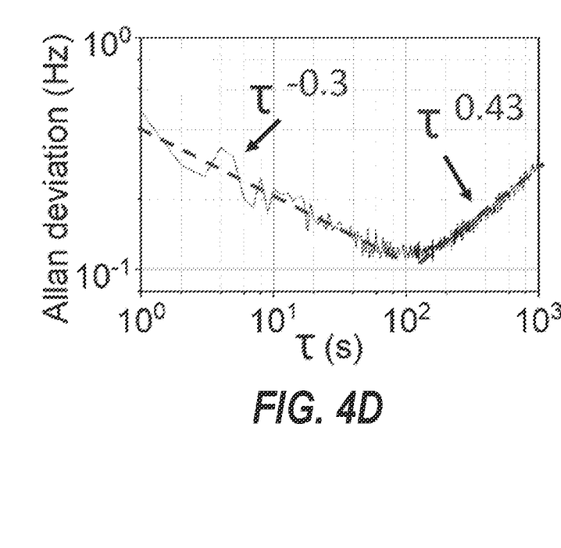
FIG. 4D is a plot of Allan deviation measured with the bidirectional mode-locked laser of FIG. 3A.

To observe the repetition rate difference ($\Delta f_{rep}$), the outputs were combined through a 50/50 coupler and detected using a photodetector and an electrical spectral analyzer. As shown in FIG. 4A, two RF tones with a small spacing of 140 Hz were observed at a resolution bandwidth of 10 Hz. As shown in the inset of FIG. 4A, by changing the pump power from 1.8 W to 2.4 W, $\Delta f_{rep}$ could be continuously tuned from 110 Hz to 160 Hz without losing or changing the mode-locked state. More significantly, continuous tuning of $\Delta f_{rep}$ from 100 Hz all the way to 0.1 Hz can be achieved by rotating the wave plates while remaining mode-locked. Next, the free-running repetition rate stability of the bidirectional mode-locked ANDi laser was characterized by the simultaneous measurements of $f_{rep}$ for both directions using two electronically synchronized frequency counters for 6000 s with a 1-s gate time. As shown in FIG. 4B, $f_{rep}$ of the CW direction (solid) and CCW direction (dashed) both drifted noticeably over time showing a peak-to-peak deviation of 66 Hz. However, it can be inferred from the nearly identical trend of the two traces that the majority of the $f_{rep}$ drift is a common-mode noise and thus it should not be present in the $\Delta f_{rep}$ (dotted trace). As observed in the zoom-in (see inset of FIG. 4B), $\Delta f_{rep}$ exhibited a much higher frequency stability and the corresponding peak-to-peak deviation was suppressed by 26 times to 2.5 Hz. To determine the common-mode noise cancelation, the measurement data were processed to obtain the power spectral density (PSD) of both $f_{rep}$ and $\Delta f_{rep}$ as shown in FIG. 4C. As can be clearly observed, >30 dB common-mode noise cancelation is attainable for slow fluctuations below 0.1 Hz. At faster time scales, the measurement approaches the counter limit and thus only an instrument-limited 10 dB noise suppression was observed. To quantify the frequency stability of $\Delta f_{rep}$, its Allan deviation was calculated, as shown in FIG. 4D. For the gate time below 100 s, the free-running Allan deviation exhibits a characteristic roll-off as $\tau^{-0.3}$, indicating that $\Delta f_{rep}$ was dominated by white and flicker frequency noise in this time scale. The free-running Allan deviation reached its minimum of 110 mHz at 100-s gate time and started to increase with a scaling of $\tau^{0.43}$ that is close to the characteristic $\tau^{0.5}$ scaling of random walk frequency noise. Thus, the long-term deviation can be attributed to the air disturbance and temperature fluctuation in the lab. Enclosing the bidirectional ANDi laser in a double-walled shielding box will better isolate it from environmental perturbations and further improve the frequency stability. In addition, as frequency drift features an Allan deviation linearly scaled with the gate time, no drift in $\Delta f_{rep}$ can be discerned.

Figure 5A:
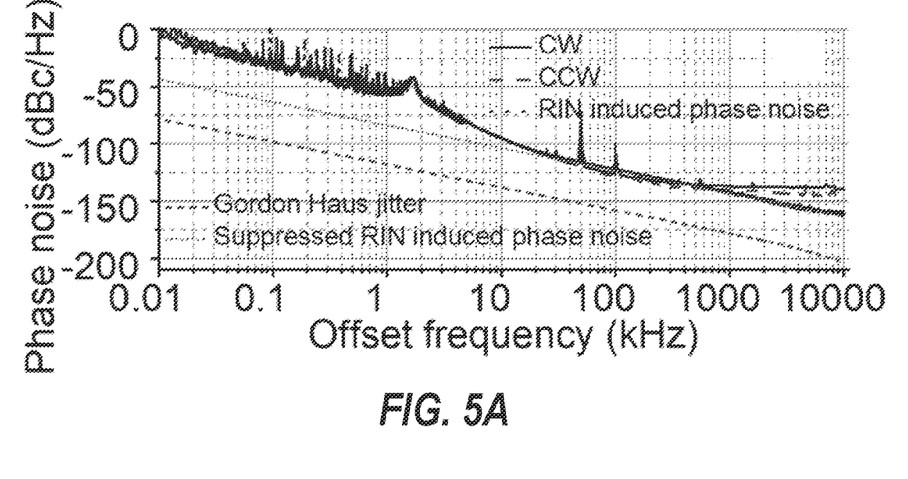
FIG. 5A is a plot of single sideband phase noise measured with the bidirectional mode-locked laser of FIG. 3A.
Figure 5B:
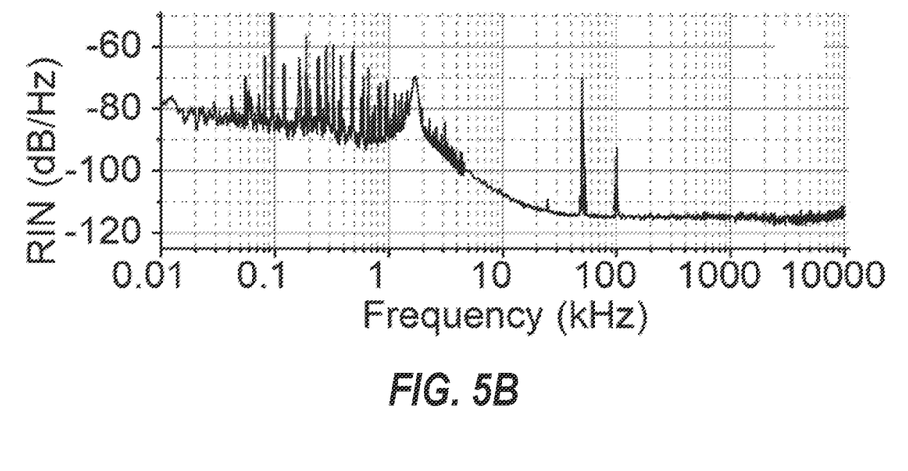
FIG. 5B is a plot of the power spectral density of the relative intensity noise of the bidirectional mode-locked laser of FIG. 3A.

To obtain a deeper insight into the source of $f_{rep}$, SSB phase noises of both CW and CCW directions at 10-GHz carrier frequency were measured, as shown in FIG. 5A. Of note, the two SSB phase noise traces were indistinguishable and they both exhibited significantly elevated phase noises for offset frequencies below 10 kHz. This excessive phase noise is attributed to the pump power fluctuation of the high-power multimode 980-nm laser, as illustrated below. The phase noise has also been compared with the unidirectional mode-locked states, and no noticeable degradation was induced by the bidirectional operations thanks to the minimized cross talk between the two directions. Similarly, the measured RINs of both directions were also indistinguishable and thus only the RIN noise of the CW direction is shown in FIG. 5B for clarity. The integrated RIN noise from 1 kHz to 5 MHz was 0.8%, more than an order of magnitude higher than state-of-the-art ANDi lasers pumped by single-mode laser diodes. As ANDi laser features large accumulated nonlinear phase, we expect the RIN induced phase noise through self-steepening to be one of the dominating noise source. The contribution of such phase noise was estimated, as shown as the dotted trace in FIG. 5A. Treating the nonlinear phase shift as the only free fitting parameter, the calculated RIN induced phase noise well overlaps with the measured phase noise when the nonlinear phase shift is 80 rad, close to the estimated value. It is concluded from the analysis that the SSB phase noise of the bidirectional ANDi laser is limited by the RIN induced phase noise, which can be well compensated through active power stabilization. The short dotted line in FIG. 5A plots the calculated RIN induced phase noise by assuming the RIN noise from 10 Hz to 10 kHz are all actively suppressed to the −115 dB level. An improvement of more than 40 dB can be achieved, and the resulting SSB phase noise will reach the same level of other free running MLFLs used as ultra-stable master oscillators. In addition, the Gordon-Haus jitter was calculated, shown as the short dashed line in FIG. 5A. As ANDi lasers feature large cavity dispersions, the SSB phase noise is ultimately going to be limited by the Gordon-Haus jitter, which is still 30 dB below the suppressed RIN induced phase noise. Therefore, longer cavity length and larger cavity dispersion can be utilized together with large-mode-area fiber to further scale the pulse energy up to 100 nJ before the Gordon Haus jitter starts to limit the laser performance.

Figure 6A:
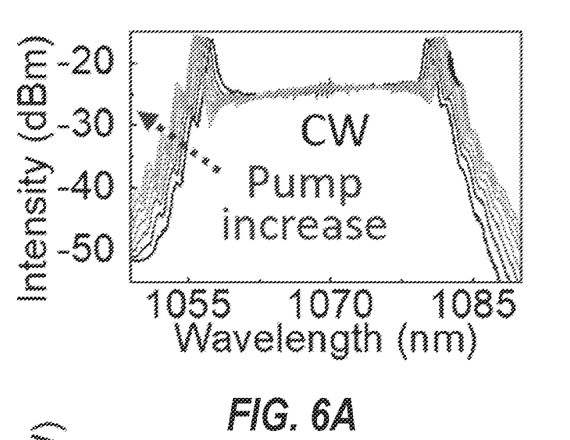
FIG. 6A is a plot showing the evolution of the optical spectrum of the clockwise output of the bidirectional mode-locked laser of FIG. 3A as pump power is varied.
Figure 6B:
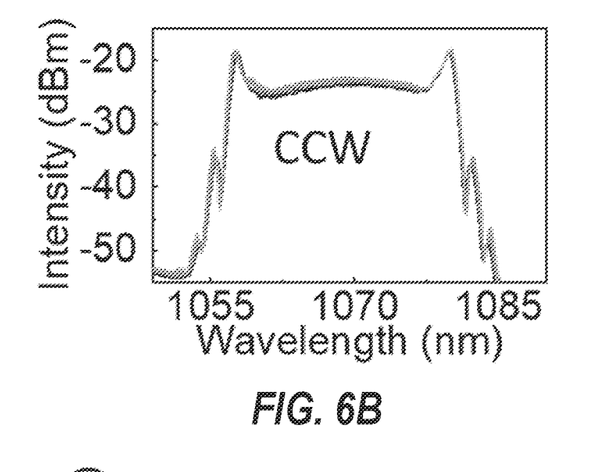
FIG. 6B is a plot showing the evolution of the optical spectrum of the counter-clockwise output of the bidirectional mode-locked laser of FIG. 3A as pump power is varied.
Figure 6C:
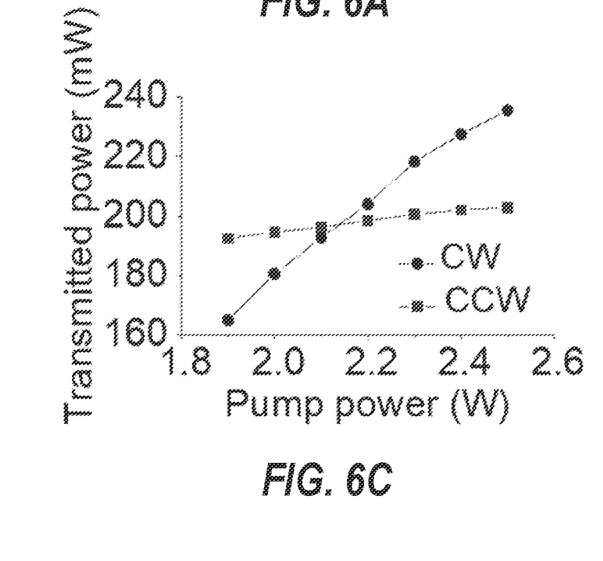
FIG. 6C is a plot of transmitted power as a function of pump power, as measured with the bidirectional mode-locked laser of FIG. 3A.
Figure 6D:
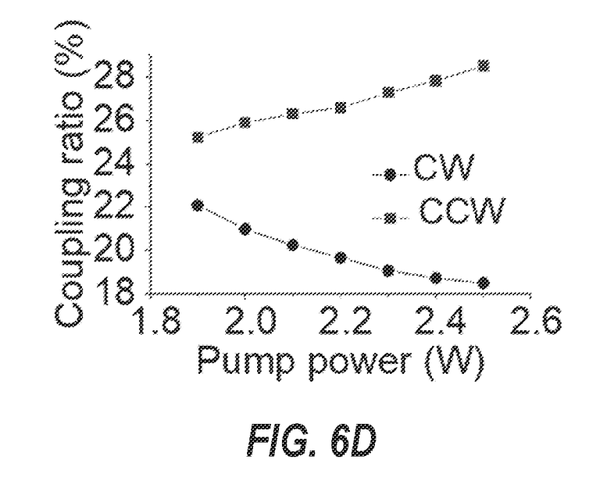
FIG. 6D is a plot of coupling ratio as a function of pump power, as measured with the bidirectional mode-locked laser of FIG. 3A.

To shed light on the physical mechanism behind the bidirectional NPR mode-locking in ANDi lasers, the pump power was varied while recording the distinctly different evolutions of optical spectra, output power, and intracavity power from the two directions. The optical spectra from CW and CCW output ports are shown in FIGS. 6A and 6B, respectively, as the pump power was tuned from 1.9 W to 2.5 W in steps of 100 mW. While the CW output spectrum broadened monolithically with the increase of the pump power, the CCW output spectrum only showed negligible changes. Such a phenomenon is universal for all the mode-locking states found at different wave plate settings. The output power and intracavity power from both directions were measured from output ports and estimated from monitor ports respectively. Then, the transmitted power and coupling ratio for both directions were calculated, as shown in FIGS. 6C and 6D, respectively. While the transmitted power in the CW direction increased by 42%, that in the CCW direction only increased by 5%, explaining the distinct spectral evolution. The different transmitted power evolution was a direct consequence of the opposite coupling ratio evolution, as shown in FIG. 6D. When the intra-cavity power increased with higher pump power, the coupling ratio of the CCW direction also increased, thus resulting in a nearly constant transmitted power. The distinct evolutions of output coupling ratio for the two directions are attributed to the different accumulated nonlinearity resulting from the cavity asymmetry. More importantly, the nearly constant transmitted power and increased coupling ratio (decreased transmission) for the CCW direction indicate that it is mode-locked around the critical saturation power (CSP), where the effect of saturable absorption is saturated and turning into reverse saturable absorption. It has been shown that the peak power clamping effect around the CSP would facilitate the amplification of background noise, inducing noise-like-pulse in unidirectional MLFLs. In this case, the mode-locking around the CSP could mitigate the gain competition between the counter propagating directions, thus leading to the bidirectional mode-locking.

Figure 7A:
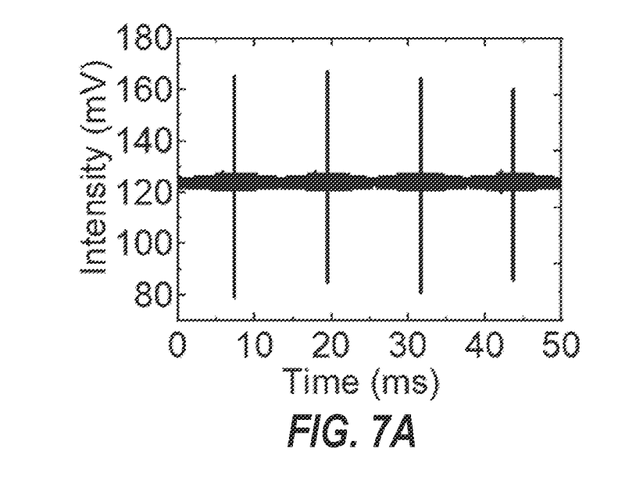
FIG. 7A shows a multi-period interferogram measured with the bidirectional mode-locked laser of FIG. 3A.
Figure 7B:
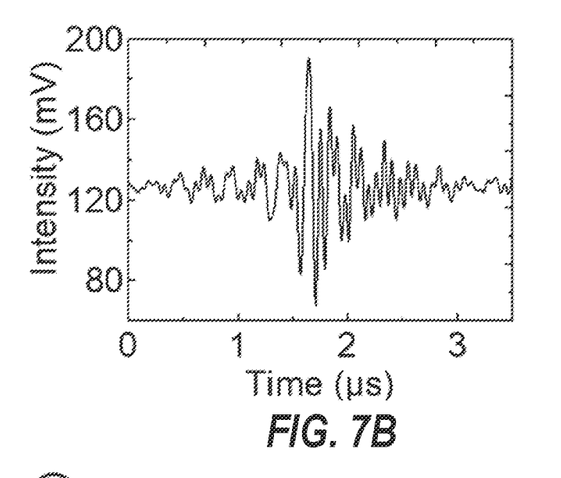
FIG. 7B shows a zoomed-in region of a single interferogram measured with the bidirectional mode-locked laser of FIG. 3A.
Figure 7C:
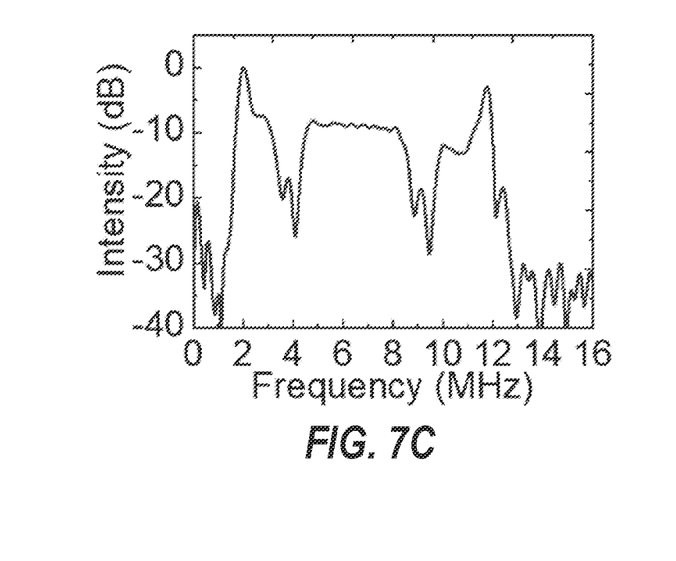
FIG. 7C shows the Fourier spectrum of the single interferogram of FIG. 7B.
Figure 7D:
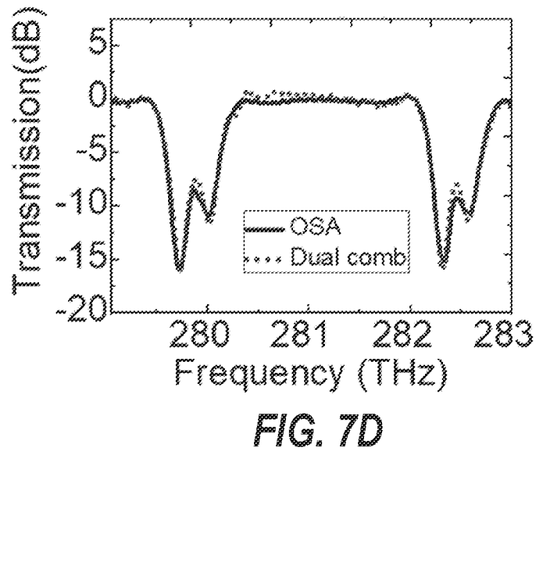
FIG. 7D compares two measured transmission spectra of a filter.

A proof-of-concept dual-comb spectroscopy was performed to measure the transmission of an OBSF. As shown in FIG. 7A, the time domain interferogram represents a $\Delta f_{rep}$ of 83 Hz, which was chosen to obtain the maximized non-aliasing bandwidth by adjusting the wave plates. The zoom-in of a single-shot interferogram is shown in FIG. 7B, which is Fourier transformed to obtain the down-converted spectrum in radio frequency (RF) domain shown in FIG. 7C. Due to the perfect spectral overlapping of the two directions, the whole spectrum is converted to the RF domain and the modulation by the filter is clearly observed. The extracted transmission of the filter matches well with that measured by an optical spectrum analyzer, as shown in FIG. 7D. Small mismatches are attributed to the RIN noise, which can be significantly mitigated after the laser is further stabilized in the next step.

Combination of Features

Features described above as well as those claimed below may be combined in various ways without departing from the scope hereof. The following examples illustrate possible, non-limiting combinations of features and embodiments described above. It should be clear that other changes and modifications may be made to the present embodiments without departing from the spirit and scope of this invention:

(A1) A bidirectional mode-locked fiber laser includes a doped optical fiber and first and second passive optical fibers coupled to opposite ends of the doped optical fiber. The bidirectional mode-locked fiber laser also includes a first polarization controller for transforming a first counter-clockwise polarization, of a counter-clockwise pulse train emitted from a first end of the first passive optical fiber, into a second counter-clockwise polarization. The bidirectional mode-locked fiber laser also includes a second polarization controller for transforming a first clockwise polarization, of a clockwise pulse train emitted from a second end of the second passive optical fiber, into a second clockwise polarization. The bidirectional mode-locked fiber laser also includes a first polarized beamsplitter for reflecting, based on the second counter-clockwise polarization, a first portion of the counter-clockwise pulse train to form a first laser output, and a second polarized beamsplitter for reflecting, based on the second clockwise polarization, a first portion of the clockwise pulse train to form a second laser output. A remaining portion of the counter-clockwise pulse train transmitted through the first polarized beamsplitter propagates through the second polarized beamsplitter and the second polarization controller to couple into the second end of the second passive optical fiber. A remaining portion of the clockwise pulse train transmitted through the second polarized beamsplitter propagates through the first polarized beamsplitter and the first polarization controller to couple into the first end of the first passive optical fiber.

(A2) In the bidirectional mode-locked fiber laser denoted (A1), the doped optical fiber and the first passive optical fiber impart a first nonlinear phase shift onto the counter-clockwise pulse train, the counter-clockwise pulse train having a counter-clockwise repetition rate. The doped optical fiber and the second passive optical fiber impart a second nonlinear phase shift onto the clockwise pulse train, the clockwise pulse train having a clockwise repetition rate. A non-zero difference between the first and second nonlinear phase shifts gives rise to a non-zero difference between the clockwise and counter-clockwise repetition rates.

(A3) In the bidirectional mode-locked fiber laser denoted (A2), a normalized difference of the clockwise and counter-clockwise repetition rates is less than or equal to $10^{-5}$.

(A4) In any of the bidirectional mode-locked fiber lasers denoted (A1) to (A3), the first and second passive optical fibers have different lengths.

(A5) In any of the bidirectional mode-locked fiber lasers denoted (A1) to (A3), the first and second passive optical fibers have similar lengths.

(A6) In any of the bidirectional mode-locked fiber lasers denoted (A1) to (A5), the first and second passive optical fibers have different nonlinear coefficients.

(A7) In any of the bidirectional mode-locked fibers lasers denoted (A1) to (A6), each of the first and second polarization controllers includes one half-waveplate and one quarter-waveplate.

(A8) In any of the bidirectional mode-locked fibers lasers denoted (A1) to (A7), each of the first and second polarization controllers is adjustable.

(A9) In any of the bidirectional mode-locked fibers lasers denoted (A1) to (A8), the bidirectional mode-locked fibers laser further includes a bandpass filter located between the first and second polarizing beamsplitters. The counter-clockwise pulse train passes through the bandpass filter in a forward direction and the clockwise pulse train passes through the bandpass filter in a reverse direction that is opposite to the forward direction.

(A10) In any of the bidirectional mode-locked fibers lasers denoted (A1) to (A9), the doped optical fiber is doped with one or more of ytterbium, erbium, neodymium, and holmium.

(A11) In any of the bidirectional mode-locked fibers lasers denoted (A1) to (A10), each of the first and second passive optical fibers is a single-mode optical fiber.

(A12) In any of the bidirectional mode-locked fibers lasers denoted (A1) to (A10), each of the doped optical fiber, the first passive optical fiber, and the second passive optical fiber is a large-mode-area optical fiber.

(A13) In the bidirectional mode-locked fiber laser denoted (A12), each of the doped optical fiber, the first passive optical fiber, and the second passive optical fiber has a similar core size.

(A14) In any of the bidirectional mode-locked fibers lasers denoted (A1) to (A13), the bidirectional mode-locked fiber laser further includes a pump combiner for coupling pump light into the doped optical fiber.

(A15) In the bidirectional mode-locked fiber laser denoted (A14), the bidirectional mode-locked fiber laser further includes a pump laser for generating the pump light.

(B1) A method for controlling any of the bidirectional mode-locked fiber lasers denoted by (A1) to (A15) includes adjusting a pump power coupled into the doped optical fiber to change a difference between a counter-clockwise repetition rate of the counter-clockwise pulse train and a clockwise repetition rate of the clockwise pulse train.

(C1) A method for controlling any of the bidirectional mode-locked fiber lasers denoted by (A1) to (A15) includes adjusting one or both of the first and second polarization controllers to change a difference between a counter-clockwise repetition rate of the counter-clockwise pulse train and a clockwise repetition rate of the clockwise pulse train.

(D1) A method for mode-locking any of the bidirectional mode-locked fiber lasers denoted by (A1) to (A15) includes mode-locking continuous-wave clockwise light of the bidirectional mode-locked fiber laser to generate the clockwise pulse train. The method also includes adjusting one or both of the first and second polarization controllers to generate continuous-wave counter-clockwise light while maintaining the clockwise pulse train. The method also includes mode-locking, after said adjusting, the continuous-wave counter-clockwise light to generate the counter-clockwise pulse train.

(E1) A method for mode-locking a bidirectional a fiber laser includes simultaneously generating clockwise and counter-clockwise pulse trains from a single ring cavity of the fiber laser. The fiber laser uses nonlinear polarization rotation to implement bidirectional artificial saturable absorption. The fiber laser is configured in a small-$df_{rep}$ regime.

(E2) In the method denoted (E1), the method further includes initiating clockwise mode-locking to generate the clockwise pulse train. The method also includes initiating counter-clockwise mode-locking to generate the counter-clockwise pulse train.

(E3) In either of the methods denoted (E1) and (E2), the clockwise pulse train has a clockwise repetition rate, the counter-clockwise pulse train has a counter-clockwise repetition rate, and a normalized difference of the clockwise and counter-clockwise repetition rates is less than $10^{-5}$.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:
1. A bidirectional mode-locked fiber laser, comprising:
   a doped optical fiber;
   first and second passive optical fibers coupled to opposite ends of the doped optical fiber;
   a first polarization controller for transforming a first counter-clockwise polarization, of a counter-clockwise pulse train emitted from a first end of the first passive optical fiber, into a second counter-clockwise polarization;
   a second polarization controller for transforming a first clockwise polarization, of a clockwise pulse train emitted from a second end of the second passive optical fiber, into a second clockwise polarization;
   a first polarized beamsplitter for reflecting, based on the second counter-clockwise polarization, a first portion of the counter-clockwise pulse train to form a first laser output; and
   a second polarized beamsplitter for reflecting, based on the second clockwise polarization, a first portion of the clockwise pulse train to form a second laser output;

wherein (i) a remaining portion of the counter-clockwise pulse train transmitted through the first polarized beamsplitter propagates through the second polarized beamsplitter and the second polarization controller to couple into the second end of the second passive optical fiber, and (ii) a remaining portion of the clockwise pulse train transmitted through the second polarized beamsplitter propagates through the first polarized beamsplitter and the first polarization controller to couple into the first end of the first passive optical fiber.

2. The bidirectional mode-locked fiber laser of claim 1, wherein:
- the doped optical fiber and the first passive optical fiber impart a first nonlinear phase shift onto the counter-clockwise pulse train, the counter-clockwise pulse train having a counter-clockwise repetition rate;
- the doped optical fiber and the second passive optical fiber impart a second nonlinear phase shift onto the clockwise pulse train, the clockwise pulse train having a clockwise repetition rate; and
- a non-zero difference between the first and second nonlinear phase shifts gives rise to a non-zero difference between the clockwise and counter-clockwise repetition rates.

3. The bidirectional mode-locked fiber laser of claim 2, wherein a normalized difference of the clockwise and counter-clockwise repetition rates is less than or equal to $10^{-5}$.

4. The bidirectional mode-locked fiber laser of claim 1, wherein the first and second passive optical fibers have different lengths.

5. The bidirectional mode-locked fiber laser of claim 1, wherein the first and second passive optical fibers have similar lengths.

6. The bidirectional mode-locked fiber laser of claim 1, wherein the first and second passive optical fibers have different nonlinear coefficients.

7. The bidirectional mode-locked fiber laser of claim 1, wherein each of the first and second polarization controllers includes one half-waveplate and one quarter-waveplate.

8. The bidirectional mode-locked fiber laser of claim 1, wherein each of the first and second polarization controllers is adjustable.

9. The bidirectional mode-locked fiber laser of claim 1, further comprising a bandpass filter located between the first and second polarizing beamsplitters;
wherein the counter-clockwise pulse train passes through the bandpass filter in a forward direction and the clockwise pulse train passes through the bandpass filter in a reverse direction that is opposite to the forward direction.

10. The bidirectional mode-locked fiber laser of claim 1, wherein the doped optical fiber is doped with one or more of ytterbium, erbium, neodymium, and holmium.

11. The bidirectional mode-locked fiber laser of claim 1, wherein each of the first and second passive optical fibers is a single-mode optical fiber.

12. The bidirectional mode-locked fiber laser of claim 1, wherein each of the doped optical fiber, the first passive optical fiber, and the second passive optical fiber is a large-mode-area optical fiber.

13. The bidirectional mode-locked fiber laser of claim 12, wherein each of the doped optical fiber, the first passive optical fiber, and the second passive optical fiber has a similar core size.

14. The bidirectional mode-locked fiber laser of claim 1, further comprising a pump combiner for coupling pump light into the doped optical fiber.

15. The bidirectional mode-locked fiber laser of claim 14, further comprising a pump laser for generating the pump light.

16. A method for controlling the bidirectional mode-locked fiber laser of claim 1, comprising:
- adjusting a pump power coupled into the doped optical fiber to change a difference between a counter-clockwise repetition rate of the counter-clockwise pulse train and a clockwise repetition rate of the clockwise pulse train.

17. A method for controlling the bidirectional mode-locked fiber laser of claim 1, comprising:
- adjusting one or both of the first and second polarization controllers to change a difference between a counter-clockwise repetition rate of the counter-clockwise pulse train and a clockwise repetition rate of the clockwise pulse train.

18. A method for mode-locking the bidirectional mode-locked fiber laser of claim 1, comprising:
- mode-locking continuous-wave clockwise light of the bidirectional mode-locked fiber laser to generate the clockwise pulse train;
- adjusting one or both of the first and second polarization controllers to generate continuous-wave counter-clockwise light while maintaining the clockwise pulse train; and
- mode-locking, after said adjusting, the continuous-wave counter-clockwise light to generate the counter-clockwise pulse train.

* * * * *